United States Patent [19]

Bahadir et al.

[11] 4,426,315

[45] Jan. 17, 1984

[54] PROCESS FOR THE PREPARATION OF SUPPORTED CATALYSTS FOR THE POLYMERIZATION OF OLEFINS

[75] Inventors: Müfit Bahadir, Zolling; Wolfgang Payer, Wesel; Ingrid Förster, Mülheim; Hans-Albert Lümmen, Essen, all of Fed. Rep. of Germany

[73] Assignee: Ruhrchemie Aktiengesellschaft, Oberhausen, Fed. Rep. of Germany

[21] Appl. No.: 338,812

[22] Filed: Jan. 11, 1982

[30] Foreign Application Priority Data

Jan. 13, 1981 [DE] Fed. Rep. of Germany ....... 3100736

[51] Int. Cl.$^3$ ................................................ C08F 4/64
[52] U.S. Cl. .................................... 502/113; 526/124; 526/125; 526/129; 526/153; 502/117; 502/126; 502/128; 502/154
[58] Field of Search ............... 252/429 B, 429 C, 428, 252/430

[56] References Cited

U.S. PATENT DOCUMENTS

| | | | |
|---|---|---|---|
| 3,591,656 | 7/1971 | Kroll | 252/429 C X |
| 3,745,154 | 7/1973 | Kashiwa | 252/429 C X |
| 4,148,754 | 4/1979 | Strobel et al. | 502/108 |
| 4,277,371 | 7/1981 | Caldo et al. | 252/429 C X |

*Primary Examiner*—Patrick Garvin

*Attorney, Agent, or Firm*—Jordan B. Bierman; Linda Bierman

[57] ABSTRACT

In a process for the preparation of a supported catalyst for the preparation of polyolefins which have a component A and a component B, wherein component A consists essentially of a reaction product of a compound of a first metal of sub groups IV to VI of the Periodic Table of the Elements with an organic compound of a second metal of main groups I to III of the Periodic Table of the Elements, said reaction being carried out at a temperature of from −60° C. to +40° C., and an inorganic carrier, component B being an organo metallic compound, the improvement comprising suspending the carrier in an agent which is oxygen, sulfur, and moisture free, simultaneously and separately adding to the carrier and the agent the compounds of the first and second metals in liquid or dissolved form, excluding oxygen and moisture from the reaction, and maintaining a molar ratio of the compound of the first metal to the compound of the second metal of 1:3 to 3:1.

The use of the catalyst in the polymerization of ethylene both with and without the presence of α olefins is also disclosed.

24 Claims, No Drawings

PROCESS FOR THE PREPARATION OF SUPPORTED CATALYSTS FOR THE POLYMERIZATION OF OLEFINS

This Application claims the priority of German Application No. 31 00 736.8, filed Jan. 13, 1981.

The present invention is directed to a method of making catalysts which are useful for the polymerization and copolymerization of $\alpha$ olefins at low pressure. The actual polymerization, using the new catalysts, is also part of the present invention.

In the past, a substantial number of processes useful in the production of supported catalysts for the polymerization of olefins have been disclosed. These differ from one another primarily by variations in impregnation; i.e. the application of the catalysts components to the carrier. These prior methods all provide an inorganic carrier having a large surface area and high porosity; e.g. silicon dioxide, aluminum oxide, clays, etc. The carrier is treated with one of the catalyst components, usually used in excess. The unabsorbed portion of this component is then washed out with an inert solvent.

The second component is then added which may form soluble products resulting from the reaction between the first and second components. The excess second component or the soluble reaction products (if formed) are washed out in a manner similar to that used in connection with the first component.

Catalysts systems of this type consist of a halogen compound of a transition metal (e.g. $TiCl_4$) which is fixed on the inorganic carrier, and an organo metallic compound of metals of Groups I to III of the Periodic Table. The latter acts as a reducing agent and simultaneously as an active constituent of the catalysts system.

One of the previously known processes for preparing catalysts of the type herein described treats activated aluminum oxide with a halogen compound of titanium. A solid reaction product is obtained which is separated, washed, and dried. It is then suspended in an inert solvent and reacted with aluminum trialkyl (see German Pat. No. 21 23 357).

In DOS No. 20 58 852, a double oxide of magnesium and aluminum is suspended in titanium tetrachloride and the resultant solid is separated by filtration, washed, and then dried. The solid component of the system is thereafter reacted with an aluminum trialkyl compound.

Still another prior art process, which is set forth in DOS No. 21 09 273, provides a carrier which is a silicon dioxide/aluminum oxide or is a mixture of silicon oxide and aluminum oxide. The carrier is charged with an organo aluminum or organo magnesium compound and the resultant solid product is filtered, washed and dried. Thereafter, it is suspended in a halogen compound of a transition metal (e.g. $TiCl_4$), and then heated. The reaction product is also filtered and washed and, after reaction with an aluminum trialkyl, is used as a catalyst for the polymerization or copolymerization of olefins.

These known processes have substantial disadvantages. For example, it is extremely difficult to adjust the amount of metal compound adsorbed by the carrier in a reproducible manner. Varying amounts of the catalyst components are adsorbed by the carrier, depending upon the conditions under which it is carried out and the particular carrier used. Moreover, excess catalyst components must be washed out with solvents, usually hydrocarbons. As a result, substantial amounts of wash solution are created which must be separated into their components and recovered by energy-consuming measures, such as distillation. In addition, the separation of the wash solutions yields environmentally harmful effluents. It should be noted that the solvents usually used for washing (e.g. hydrocarbons such as hexane) frequently contain impurities which tend to poison the catalyst. Thus, in any washing operation, an indeterminable proportion of the catalyst is deactivated. Such deactivation is more noticeable when the metal compound concentration on the surface of the carrier is lower. Also, when Grignard reagents are used as active components on the carrier, the ether must be removed in a vacuum. This procedure is difficult and expensive to carry out on a large, commercial scale.

Therefore, it is among the objects of the present invention to develop a process for the preparation of supported catalysts useful in the polymerization of $\alpha$ olefins which avoids some or all of the aforementioned disadvantages. In particular, it is among the objects of the present invention to enable the metal concentration on the carrier surface to be controlled with improved precision.

The process of the present invention is suitable for the preparation of catalysts which consist of the reaction product of compounds of the metals of sub groups IV to VI of the Periodic Table with organic compounds of the metals of Groups I to III of the Periodic Table, which are activated by organo metallic compounds, and which have widely varying compositions.

The present invention comprises a process for the production of catalysts having component A which is the reaction product of compounds of metals of sub groups IV to VI of the Periodic Table with organic compounds of metals of Groups I to III of the Periodic Table, and an inorganic carrier. The reaction takes place at temperatures of between $-60°$ C. and $+40°$ C. Component B of the catalyst is an organo metallic compound.

It is a feature of the present invention that component A is prepared by first suspending the inorganic carrier in an inert solvent and adding thereto the compounds of the metals of sub groups IV to VI and the compounds of the metals of Groups I to III in a liquid and/or dissolved form. The addition to the suspended carrier should be carried out simultaneously but separately, with the exclusion of moisture and oxygen. The molar ratio of the sub group metals to those of the main group is advantageously 1:3 to 3:1.

Surprisingly, it has been found that the catalysts made in accordance with the foregoing are extremely active for the polymerization or copolymerization of olefins. Moreover, they can be readily prepared in a reproducible manner. The process for preparation is quite simple, and eliminates the necessity to use—and subsequently process—large amounts of liquid. This avoids damage to the catalysts due to the washing step.

Suitable first compounds of the first metals of sub groups IV to VI include titanium (IV) compounds, vanadium compounds, and compounds of zirconium, molybdenum, and tungsten. More specifically, such compounds as $TiCl_4$, $TiBr_4$, $TiCl_3(OC_2H_5)$, $TiCl_3(O\text{-n-}C_3H_7)$, $TiCl_2(O\text{-n-}C_4H_9)_2$, $TiCl(O\text{-i-}C_3H_7)_3$, $Ti(OC_2H_5)_4$, $VCl_4$ and $VOCl_3$ have been found especially useful.

As the organic compounds of the second metals of Groups I to III of the Periodic Table, lithium alkyls or aryls, certain dialkyl and diaryl magnesium compounds, and certain aluminum compounds have been found quite suitable.

More specifically, the magnesium compounds are of the general formula $MgR_mX_{2-m}$, wherein R is straight or branched chain alkyl having 1 to 16 carbon atoms and/or unsubstituted or substituted phenyl radicals, X is chlorine, bromine, or iodine, and m is 1 or 2. The aluminum compounds are of the general formula $AlR_nY_{3-n}$, wherein R is as set forth above, Y is chlorine, bromine, iodine, or hydrogen, and n is 1, 2, or 3. The aluminum compounds useful in this invention also include reaction products of aluminum trialkyls or aluminum dialkyl hydrides containing alkyl radicals having 1 to 16 carbon atoms, with $C_4$ to $C_{20}$ dienes, such as 1,4-butadiene, isoprene, 1,3-pentadiene, and myrcene.

As the magnesium compounds, dimethyl magnesium, diethyl magnesium, diphenyl magnesium, are useful. Suitable organic aluminum compounds are aluminum trialkyls such as $Al(C_2H_5)_3$, $Al(n-C_3H_7)_3$, $Al(n-C_4H_9)_3$, $Al(i-C_4H_9)_3$, $Al(n-C_8H_{17})_3$, $Al(C_2H_5)_2H$, $Al(C_3H_7)_2H$, $Al(i-C_4H_9)_2H$, dialkyl monochlorides such as $(C_2H_5)_2AlCl$, $(i-C_4H_9)_2AlCl$ and alkyl aluminium sesquichlorides such as $(C_2H_5)_3Al_2Cl_3$. Especially preferred, are the reaction products of $Al(i-C_4H_9)_3$ or $Al(i-C_4H_9)_2H$ with isoprene. These are commercially available under the trademark "Aluminiumisoprenyl."

Carriers useful in the present invention include inorganic oxides, double carbonates, microglass spheres, glass fibers, carbon fibers, and metal hydroxides, chlorides, and oxychlorides. More specifically, such materials as silicon dioxide, precipitated kieselguhr, aerosil, aluminum oxide, magnesium oxide, $CaMg(CO_3)_2$, $Mg(OH)_2$ and $MgCl_2$ may be used with advantage herein. The particle size of the carriers is not critical, but it does determine the particle size of the polymer product. Solid particles of the size of from 1 micron to 250 microns are to be preferred. The carriers are preferably heated for a substantial time in order to dry them fully and, if necessary, activate them. Heating to temperatures of 105° C. to 900° C. for a period of 2 to 20 hours has been found satisfactory.

In order to carry out the conversion, the carrier is suspended in an inert suspension agent. Suitable agents are aliphatic or cycloaliphatic hydrocarbons, such as pentane, hexane, heptane, cyclohexane, and methylcyclohexane; as well as benzine and diesel oil fractions. The suspension agent must be free of oxygen, sulfur compounds, and moisture and the reaction, itself, must be carried out in the absence of oxygen and moisture.

The first compounds and the organic compounds are added simultaneously, from separate storage containers, to the suspension which comprises the suspension agent and the carrier. The organic compounds are dissolved in an inert solvent (which may be the same as the suspension agent), and the first compound may also be similarly dissolved. However, the latter may be used in undiluted form.

The molar ratio between the first compounds and the organic compounds depends upon the number of organic radicals on the second metals. Generally, this will be from 1:3 to 3:1, especially 1:1 to 3:1.

The amount of carrier material is determined by the concentration of active constituents which is desired. The concentration is advantageously, depending upon the particular metal, between 0.01 and 15% by weight of metal based on the carrier. If titanium compounds are used, a concentration of 0.01 to 10% by weight of metal based on the carrier is preferred.

The reactants are desirably added slowly to the well-stirred suspension. It is important to avoid local over concentrations of the reduced transition metal compound in relation to the amount of carrier. The temperature is, as previously stated, between −60° C. and +40° C. The preferred temperature range is from −20° C. to +10° C.

The present process is illustrated by the use of the reaction of titanium tetrachloride with an aluminum trialkyl compound in a hydrocarbon as the suspension agent. Titanium tetrachloride and aluminum alkyl are added separately but simultaneously, in dropwise fashion, to the carrier suspension. A very dilute titanium trichloride solution is formed. The titanium trichloride does not crystallize out, since there are too few molecules thereof. On the other hand, a very large carrier surface is present, so that the titanium trichloride, being sparingly soluble in the suspension agent, is adsorbed thereon. In other words, the carrier particles act as crystallization nuclei. In order to suppress the competing reaction which involves the formation of free titanium trichloride crystals, the titanium tetrachloride and aluminum alkyl must be simultaneously added very slowly and at low temperature.

The adsorption onto the carrier surface may be followed microscopically. If the reactants are added rapidly and/or at elevated temperatures, isolated titanium trichloride crystals, in addition to the brown carrier particles adsorbed by the titanium trichloride, can be recognized under fairly high magnification. With slow addition and at low temperatures, on the other hand, only colored carrier particles are obtained. Because the carrier is merely a crystallization nucleus for the titanium compound, its surface structure and chemistry are not particularly critical. However, a high hydroxyl content on the surface is to be avoided.

The superiority of the present invention is clearly demonstrated when glass spheres are used as the carrier, and titanium trichloride is the compound being charged. The preferred spheres are those sold under the trademark Ballotini-Mikroglas. If one attempts to apply the titanium tetrachloride to the microglass by suspending the spheres in a solution of titanium tetrachloride in a benzine fraction, after filtration and washing the residue with benzine, all the titanium is found in the filtrate. Thus, no titanium tetrachloride has been permanently adsorbed on the glass surface.

On the other hand, if the procedure of the present invention is followed, then all the available titanium is fixed on the glass. This adsorption is easily seen microscopically by the coloration of the glass spheres and the absence of titanium trichloride crystals.

After component A is prepared in accordance with the foregoing, it is then activated by contact with an organometallic compound (component B). It is then useful as a catalyst for homo- and copolymerization of olefins in solution, gas phase, or suspension.

The activators useful in the present invention include all organo-aluminum compounds which are employed in the preparation of component A. Particularly suitable compounds are those with the formulas $AlR_3$ and $AlR_2Cl$, wherein R is straight or branched chain alkyls having 1 to 16 carbon atoms. The desirable molar ratio of first metal to second metal in the finished catalyst is 1:100 to 1:0.5.

The catalyst of the present invention are extremely active. They give such high yields in the polymerization of ethylene alone, as well as ethylene with α olefins, that the removal of the catalysts from the product is not necessary. At the same time, the invention provides the possibility of directly incorporating by polymerization various fillers independently of their surface chemistry. The polymerization proceeds at 30° C. to 120° C. and 2 to 100 bars pressure.

The following Examples are intended to illustrate the invention.

EXAMPLE 1

Catalyst preparation

Precipitated silicon dioxide with a BET surface of 300 $m^2/g$ and a pore volume of 1.65 $cm^3/g$ (supplied by Grace under the name GRACE 952) is dried for 6 hours at 600° C. 20 g of the dry silicon dioxide is suspended in 125 ml of a hydrocarbon fraction (b.p. 140° C.–170° C.) in a dry 1 liter 3-necked flask rinsed with $N_2$. The flask is provided with a paddle stirrer operating at 450 rpm and is maintained at 0° C. 2.8 mmole $TiCl_4$ and 3.2 mmole isoprenyl aluminum (IPRA), in each case dissolved in 100 ml of the hydrocarbon used as the suspension agent, are simultaneously added dropwise to this suspension from 2 separate vessels over the course of 2 hours. The suspension is then stirred for a further 2.5 hours at 0° C. The titanium concentration in the suspension is calculated as 8.6 mg-atom Ti/l.

Polymerization 2 liters of the hydrocarbon used for the catalyst preparation, 115 ml of catalyst suspension and 10 mmole IPRA are heated to 80° C. in a dry 3 liter glass autoclave flushed with $N_2$, and ethylene is added up to a pressure of 4 bars. This pressure is maintained during the polymerization, which lasts 5 hours, by the further addition of ethylene. Finally, the polymerization is stopped by adding isopropanol, and the polyethylene formed is filtered off and dried. In all, 725 g of polyethylene is obtained, corresponding to a catalyst consumption of 1.4 mg-atom Ti/kg of polyethylene. The properties of the product are shown in Table 1.

COMPARISON EXAMPLE 1

Catalyst preparation 2.8 mmole $TiCl_4$ dissolved in 100 ml of hydrocarbon is added at 0° C. and 450 rpm within 2 hours to the suspension prepared as in Example 1 of 20 g of dried silicon dioxide in 125 ml of hydrocarbon, and the whole is stirred for a further 4.5 hours at the same temperature and same speed. The unreacted $TiCl_4$ is then washed out by repeated decanting. The titanium concentration in the suspension is 12.0 mg-atom Ti/l, corresponding to a degree of conversion of 96%.

Polymerization

The polymerization is carried out similarly to Example 1 with the use of 83 ml of catalyst suspension and 10 mmole of IPRA. 470 g of polyethylene is obtained, corresponding to a catalyst consumption of 2.1 g-atom Ti/kg polyethylene. The properties of the product are shown in Table 1.

EXAMPLE 2

Catalyst preparation

The catalyst is prepared as in Example 1, except that the molar amounts of $TiCl_4$ and IPRA used are multiplied by four. All the remaining amounts and reaction conditions are unchanged. The titanium concentration in the suspension is calculated as 34.4 mg-atom Ti/l.

Polymerization

Polymerization is carried out using 29 ml of catalyst suspension and 10 mmole IPRA under the conditions of Example 1. 730 g of polyethylene is obtained, corresponding to a catalyst consumption of 1.4 mg-atom Ti/kg of polyethylene. The properties of the product are shown in Table 1.

EXAMPLE 3

Catalyst preparation

Microglass spheres of Na-Ca-silicate glass with a fire-polished smooth surface and without pores (they are supplied as fillers for reinforcing plastics, e.g. by Ballotini—BALLOTINI-Mikroglas spheres) are suspended for 12 hours in distilled water, and then filtered and dried for 4 hours at 120° C. 20 g of the pretreated microglass spheres, 11.2 mmole $TiCl_4$ and 13.0 mmole IPRA in a total amount of 325 ml of hydrocarbon and then used, under the conditions of Example 1, for the catalyst preparation. The titanium concentration in the finished catalyst suspension is calculated as 34.4 mg-atom Ti/l.

Polymerization 13.8 ml of catalyst suspension and 5 mmole IPRA are polymerized in a 3 liter steel autoclave under the conditions of Example 1. 785 g of polyethylene is obtained, corresponding to a catalyst consumption of 0.6 mg-atom Ti/kg polyethylene. The properties of the product are shown in Table 1.

COMPARISON EXAMPLE 2

Catalyst preparation 11.2 mmole $TiCl_4$ dissolved in 100 ml of hydrocarbon is added at 0° C. and 450 rpm within 1 hour to a suspension of 20 g of pretreated microglass spheres in 125 ml of hydrocarbon, prepared as in Example 3. The whole is stirred for a further 4 hours at the same temperature and speed. Unconverted $TiCl_4$ is then washed out by repeated decanting. No titanium can be detected in the resultant suspension. Under these conditions $TiCl_4$ is not adsorbed onto the glass surface.

EXAMPLE 4

Catalyst preparation

Pulverulent Ca-Mg double carbonate (e.g. as filler for plastics supplied by Norwegian Talc under the name Microdol Extra) is dried for 6 hours at 600° C. 20 g of pretreated powder, 45 mmole $TiCl_4$ and 52 mmole IPRA in a total of 310 ml of hydrocarbon are used to prepare the catalyst in accordance with Example 1. The titanium concentration in the finished catalyst suspension is calculated as 145 mg-atom Ti/l.

Polymerization

Polymerization is carried out in the apparatus and under the conditions of Example 1 using 3.5 ml of catalyst suspension and 5 mmole IPRA. 725 g of polyethylene is obtained, corresponding to a catalyst consumption of 0.7 mg-atom Ti/kg polyethylene. The properties of the product are shown in Table 1.

TABLE 1

Product properties

| Example | Catalyst consumption (mg-atom Ti/kg PE) | ZST (N/2 mm) | $a_{ks}$ EK (mJ/mm$^2$) | $a_{ks}$ DK (mJ/mm$^2$) | at 120° C. $\delta_B$ (N/mm$^2$) | at 120° C. $\delta_R$ (N/mm$^2$) | at 120° C. $\delta_R$ (%) | Density (g/cm$^3$) | Indentation hardness (N/mm$^2$) | Bulk density (g/cm$^3$) |
|---|---|---|---|---|---|---|---|---|---|---|
| Example 1 | 1.4 | 0.48 | 160 | 235 | 3.2 | 26.6 | 782 | 0.942 | 38 | 0.38 |
| Comparison Example 1 | 2.1 | 0.74 | 153 | 200 | 3.3 | 27.8 | 798 | 0.943 | 39 | 0.46 |
| Example 2 | 1.4 | 0.46 | 168 | 259 | 3.4 | 28.3 | 825 | 0.936 | 38 | 0.38 |
| Example 3 | 0.6 | 0.32 | 166 | 267 | 3.8 | 32.9 | 975 | 0.933 | 38 | 0.25 |
| Example 4 | 0.7 | 0.29 | 155 | 234 | 3.5 | 33.2 | 1038 | 0.931 | 37 | 0.36 |

ZST is yield value;
$a_{ks}$ is notched impact strength;
EK is singly notched;
DK is doubly notched;
$\delta_B$ is tensile strength at maximum load;
$\delta_R$ is tensile strength at break;
$\delta_R$ is elongation at break ZST is yield value; $a_{ks}$ is notched impact strength; EK is singly notched; DK is doubly notched; $\delta_B$ is tensile strength at maximum load; $\delta_R$ is tensile strength at break; $\delta_R$ is elongation at break

EXAMPLES 5-10

In the following Examples 5-10 the catalyst is prepared using the amounts and under the reaction conditions of Example 2, i.e. 20 g of dried silicon dioxide (GRACE 952) is used with 11.2 mmole transition metal compound and 12.8 mmole organometallic compound simultaneously for the catalyst preparation, the metal components being varied both for the catalyst preparation and the activation in the homopolymerization of ethylene.

The polymerizations are carried out with the addition of 1 mg-atom catalyst component based on the transition metal as well as 10 mmoles aluminum alkyl compound under the conditions of Example 1. The catalyst components and activators for the polymerization and the product properties of the polymers obtained are shown in Table 2.

TABLE 2a

Catalyst components

| Examples | Transition metal compound | Organometallic compound | Activator | Catalyst consumption[1] (mg-atom M/kg PE) |
|---|---|---|---|---|
| 5 | TiCl$_4$ | IPRA[2] | TNOA[3] | 1.6 |
| 6 | TiCl$_4$ | TNOA | TNOA | 2.0 |
| 7 | TiCl$_4$ | TNOA | IPRA | 1.5 |
| 8 | TiCl$_4$ | DEAC[4] | IPRA | 2.2 |
| 9 | VOCl$_3$ | IPRA | IPRA | 1.7 |
| 10 | Ti(OEt)$_4$ | BuOcMg[5] | DEAC | 2.4 |

[1] Catalyst consumption referred to the transition metal:
[2] IPRA = isoprenyl aluminium;
[3] TNOA = tri-n-octyl aluminium;
[4] DEAC = di-ethyl aluminium chloride;
[5] BuOcMg = (n-butyl)$_{1.5}$(n-octyl)$_{0.5}$-magnesium.

TABLE 2b

Polymer properties

| Examples | ZST (N/mm$^2$) | $a_{ks}$ EK (mJ/mm$^2$) | $a_{ks}$ DK (mJ/mm$^2$) | at 120° C. $\delta_B$ (N/mm$^2$) | at 120° C. $\delta_R$ (N/mm$^2$) | $\delta_R$ | Density (g/cm$^3$) | Indentation hardness (N/mm$^2$) | Bulk density (g/cm$^3$) |
|---|---|---|---|---|---|---|---|---|---|
| 5 | 0.64 | 155 | 208 | 3.7 | 26.4 | 788 | 0.944 | 41 | 0.39 |
| 6 | 0.70 | 154 | 187 | 3.3 | 22.0 | 713 | 0.941 | 38 | 0.27 |
| 7 | 0.28 | 157 | 225 | 3.7 | 30.7 | 968 | 0.938 | 38 | 0.30 |
| 8 | 0.37 | 142 | 191 | 3.6 | 29.5 | 903 | 0.941 | 37 | 0.13 |
| 9 | 1.30 | 111 | 131 | 3.8 | 32.4 | 796 | 0.929 | 34 | 0.19 |
| 10 | 0.18 | 146 | 200 | 3.8 | 24.2 | 897 | 0.938 | 37 | 0.09 |

ZST is yield value;
$a_{ks}$ is notched impact strength;
EK is singly notched;
DK is doubly notched;
$\delta_B$ is tensile strength at maximum load;
$\delta_R$ is tensile strength at break;
$\delta_R$ is elongation at break While only a limited number of specific embodiments of the present invention have been expressly disclosed, it is, nonetheless, to be broadly construed and not to be limited except by the character of the claims appended hereto.

What we claim is:

1. In a process for the preparation of a supported catalyst for the polymerization of olefins having a component A and a component B, wherein said component A consists essentially of a reaction product of
    at least one first compound of one or more first metals of subgroups IV to VI of the Periodic Table of the Elements with
    at least one organic compound of one or more second metals of main groups I to III of the Periodic Table of the Elements, said reaction being carried out at a temperature of from −60° C. to 40° C., and an inorganic carrier,
said component B being an organometallic compound, the improvement which comprises suspending said carrier in a suspension agent, said agent being substantially oxygen, sulfur and moisture free, simultaneously and separately adding to said carrier and said agent said first compound and said organic compound in liquid and/or dissolved form, excluding oxygen and moisture, the molar ratio of said first compound to said organic compound being 1:3 to 3:1.

2. The process of claim 1 wherein said first compound and said organic compound are dissolved in a solvent.

3. The process of claim 1 wherein said agent is an inert solvent.

4. The process of claim 1 wherein said first metals are 0.01% to 15.0% by weight based on said carrier.

5. The process of claim 4 wherein said first metal is titanium and is 0.01% to 10.0% by weight based on said carrier.

6. The process of claim 1 wherein said temperature is $-20°$ C. to $10°$ C.

7. The process of claim 1 wherein said first metal is titanium, vanadium, zirconium, molybdenum, or tungsten.

8. The process of claim 7 wherein said first compound is a titanium (IV) compound.

9. The process of claim 7 wherein said first compound is
$TiCl_4$, $TiBr_4$, $TiCl_3(OC_2H_5)$,
$TiCl_3(O\text{-}n\text{-}C_3H_7)$, $TiCl_2(O\text{-}n\text{-}C_4H_9)_2$,
$TiCl(O\text{-}i\text{-}C_3H_7)_3$, $Ti(OC_2H_5)_4$, $VCl_4$, or $VOCl_3$.

10. The process of claim 1 wherein said organic compound is taken from the class consisting of lithium alkyls; lithium aryls; compounds of the formula $MgR_nX_{2-m}$, wherein R is straight or branched chain alkyl having 1 to 16 carbon atoms and/or substituted or unsubstituted phenyl, X is chlorine, bromine, or iodine, and m is 1 or 2; compounds of the formula $AlR_nY_{3-n}$ wherein n is 1 to 3 and Y is chlorine, bromine, iodine, or hydrogen; reaction products of aluminum trialkyls or aluminum dialkyl hydrides having alkyl radicals with 1 to 16 carbon atoms with dienes having 4 to 20 carbon atoms.

11. The process of claim 10 wherein said organic compound is taken from the class consisting of lithium alkyls, lithium aryls, dialkyl and diaryl magnesium compounds, aluminum trialkyls, aluminum dialkyl monochloride, and alkyl aluminum sesquichlorides.

12. The process of claim 10 wherein said dienes are taken from the class consisting of 1,4-butadiene, isoprene, 1,3-pentadiene, and myrcene.

13. The process of claim 10 wherein said organic compound is
dimethyl magnesium, diethyl magnesium, diphenyl magnesium,
$Al(C_2H_5)_3$, $Al(n\text{-}C_3H_7)_3$, $Al(n\text{-}C_4H_9)_3$,
$Al(i\text{-}C_4H_9)_3$, $Al(n\text{-}C_8H_{17})_3$, $Al(C_2H_5)_2H$,
$Al(C_3H_7)_2H$, $Al(i\text{-}C_4H_9)_2H$, $(C_2H_5)_2AlCl$,
$(i\text{-}C_4H_9)_2AlCl$, or $(C_2H_5)_3Al_2Cl_3$.

14. The process of claim 1 wherein said carrier is taken from the class consisting of inorganic oxides, double carbonates, microglass spheres, glass fibers, carbon fibers, and metal hydroxides, chlorides and oxychlorides.

15. The process of claim 14 wherein said carrier is silicon dioxide, precipitated kieselguhr, aerosil, aluminum oxide, magnesium oxide, $CaMg(CO_3)_2$, microglass spheres, glass fibers, carbon fibers, $Mg(OH)_2$, or $MgCl_2$.

16. The process of claim 1 wherein said carrier has a particle size of from 1 to 250 microns.

17. The process of claim 1 wherein said carrier heated to $150°$ C. to $900°$ C. for 2 to 20 hours before said reaction.

18. The process of claim 1 wherein said suspension agent is a hydrocarbon.

19. The process of claim 18 wherein said agent is pentane, hexane, heptane, cyclohexane, methylcyclohexane, benzine, or diesel oil fractions.

20. The process of claim 1 wherein said ratio is 1:1 to 3:1.

21. The process of claim 1 wherein said component B is an activator for said component A.

22. The process of claim 21 wherein said component B is a compound of the formula $AlR_nY_{3-n}$.

23. The process of claim 22 wherein said component B is $AlR_3$ or $AlR_2Cl$ wherein R is straight or branched chain alkyl having 1 to 16 carbon atoms.

24. The process of claim 1 wherein the molar proportion of said first metals to said second metals is 1:100 to 1:05.

* * * * *